United States Patent
Agrawal et al.

(10) Patent No.: US 11,347,040 B2
(45) Date of Patent: May 31, 2022

(54) 3D TARGET FOR OPTICAL SYSTEM CHARACTERIZATION

(71) Applicant: Double Helix Optics Inc., Boulder, CO (US)

(72) Inventors: Anurag Agrawal, Boulder, CO (US); Scott Gaumer, Boulder, CO (US); Warren Colomb, Boulder, CO (US)

(73) Assignee: Double Helix Optics Inc., Boulder, CO (US)

( * ) Notice: Subject to any disclaimer, the term of this patent is extended or adjusted under 35 U.S.C. 154(b) by 0 days.

(21) Appl. No.: 16/780,987

(22) Filed: Feb. 4, 2020

(65) Prior Publication Data

US 2020/0264417 A1 Aug. 20, 2020

Related U.S. Application Data

(60) Provisional application No. 62/805,508, filed on Feb. 14, 2019.

(51) Int. Cl.
*G02B 21/00* (2006.01)
*G01N 21/01* (2006.01)

(52) U.S. Cl.
CPC ......... *G02B 21/0072* (2013.01); *G01N 21/01* (2013.01)

(58) Field of Classification Search
CPC .. G01N 21/01; G01N 21/278; G01N 21/6458; G02B 21/0072; G02B 21/006
USPC ............... 356/243.1–243.8, 237.1–237.6, 356/239.1–239.8
See application file for complete search history.

(56) References Cited

U.S. PATENT DOCUMENTS

| | | | |
|---|---|---|---|
| RE38,943 E | * | 1/2006 | Komma ............... G02B 3/10 359/19 |
| 7,705,970 B2 | | 4/2010 | Piestun et al. |
| 8,620,065 B2 | | 12/2013 | Piestun et al. |
| 8,693,742 B2 | | 4/2014 | Piestun et al. |
| 9,720,222 B2 | | 8/2017 | Goodwin |
| 9,858,464 B2 | | 1/2018 | Piestun et al. |
| 9,967,541 B2 | | 5/2018 | Piestun |
| 2005/0035311 A1 | * | 2/2005 | Asakawa ............ G02F 1/1309 250/559.16 |
| 2005/0244953 A1 | * | 11/2005 | Cohen ............... G01N 30/74 435/287.2 |
| 2010/0208250 A1 | * | 8/2010 | Ihara ............... H05K 1/0269 356/237.4 |

(Continued)

FOREIGN PATENT DOCUMENTS

WO WO2005116716 12/2005

OTHER PUBLICATIONS

Alberto Diaspro, Federico Federici, and Mauro Robello, "Influence of refractive-index mismatch in high-resolution three-dimensional confocal microscopy," Applied Optics 41, 685-690 (2002)).

*Primary Examiner* — Tri T Ton
(74) *Attorney, Agent, or Firm* — Maschoff Brennan; Paul G. Johnson

(57) ABSTRACT

An imaging target for characterization of an optical system has a structure, formed on a substrate, wherein the structure has a base level and has one or more staging surfaces spaced apart from the base level and disposed over a range of distances from the base level; and one or more localized light sources disposed along the one or more staging surfaces of the structure and configured to direct light through or from the structure.

21 Claims, 17 Drawing Sheets

(56) References Cited

U.S. PATENT DOCUMENTS

2013/0300833 A1* 11/2013 Soeller ................. G06K 9/4671
    348/46
2014/0313576 A1* 10/2014 Uhl ........................ G02B 27/58
    359/385
2018/0202921 A1* 7/2018 Kobayashi ........... G02B 21/084

* cited by examiner

3D TARGET FOR OPTICAL SYSTEM CHARACTERIZATION

This application claims the benefit of U.S. Provisional Application Ser. No. 62/805,508 entitled "3D TARGET FOR OPTICAL SYSTEM CHARACTERIZATION" in the names of Anurag Agrawal et al., filed 14 Feb. 2019 and incorporated herein in its entirety.

FIELD OF THE INVENTION

The disclosure relates generally to characterization of optical systems used for imaging, tracking, localization, and measurement functions and more particularly relates to apparatus and methods for characterization and correction of optical system response in three dimensions.

BACKGROUND

Optical systems are known to suffer from aberrations, distortions, and other systematic effects that compromise the results of measurements obtained with the system and that can add systematic errors to measurements obtained. These aberrations and artifacts can be a function of the three-dimensional position of the object with respect to the imaging system, the refractive index of the medium in which the object is immersed, and the emission spectrum of the object being observed. Without proper characterization of this multi-dimensional optical distortion field, misinterpretation of results can occur, leading to a degradation of the optical system's performance.

Conventional calibration targets for optical apparatus can provide high levels of accuracy for 2D calibration, measuring optical response of the system with respect to x- and y-plane (horizontal/vertical) metrics. However, a number of high-resolution optical apparatus now provide the capability for imaging in the axial or z-axis dimension. Calibration techniques for advanced systems that provide 3D imaging capability must address more complex challenges than are handled using conventional 2D approaches.

Thus, there is clearly a need for apparatus and methods that can correctly characterize the three-dimensional distortion field of an optical imaging system.

SUMMARY OF THE INVENTION

It is an object of the present disclosure to advance the art of optical imaging system characterization for systems that acquire image content used for generating measurement or distance information in three dimensions. The apparatus and methods described herein can be applied with any of a number of 3D imaging modalities, including but not limited to high-resolution wide-field microscopy, restoration microscopy, total internal reflection fluorescence (TIRF) microscopy, confocal microscopy, single molecule localization microscopy, Structured-illumination microscopy (SIM), Stimulated emission depletion (STED) microscopy, and surface topology/depth imaging.

With this object in mind, the present disclosure describes an imaging target for characterization of an optical system, the target comprising: a structure, formed on a substrate, wherein the structure has a base level and has one or more staging surfaces spaced apart from the base level and disposed over a range of distances from the base level; and one or more localized light sources disposed along the one or more staging surfaces of the structure and configured to emit direct light from or through the structure.

Additional features and advantages will be set forth in the detailed description which follows, and will be readily apparent to those skilled in the art from the description, or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and, together with the description, serve to explain principles and operation of the various embodiments.

DETAILED DESCRIPTION OF THE INVENTION

Figure 1A:
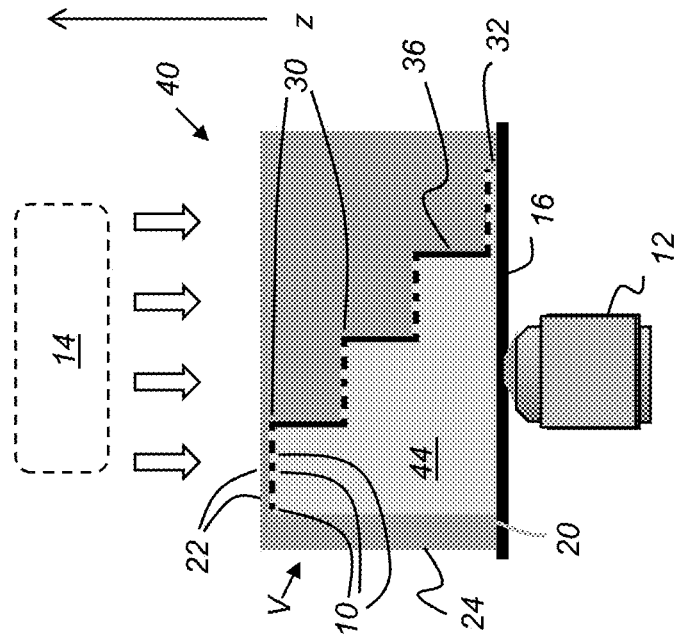
FIGS. 1A, 1B, and 1C show, in schematic form, three exemplary types of point source emitters that can be used with a 3D target described herein, shown for use with a microscopy system.

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation.

The figures provided may not show various supporting components, including optical mounts, for example. It can be appreciated by those skilled in the optical arts that embodiments of the present invention can use any of a number of types of standard mounts and support components.

In the context of the present disclosure, terms such as "top" and "bottom" or "above" and "below" or "beneath" are relative and do not indicate any necessary orientation of a component or surface, but are used simply to refer to and distinguish views, opposite surfaces, spatial relationships, or different light paths within a component or apparatus. Similarly, terms "horizontal" and "vertical" may be used relative to the figures, to describe the relative spatial relationship of components or light in different planes, for example, but do not indicate any required orientation of components with respect to true horizontal and vertical orientation.

Where they are used, the terms "first", "second", "third", and so on, do not necessarily denote any ordinal or priority relation, but are used for more clearly distinguishing one element or time interval from another. These descriptors can be used to clearly distinguish one element from another similar or related element in the context of the present disclosure and claims.

As used herein, the term "energizable" relates to a device or set of components that perform an indicated function upon receiving power and, optionally, upon receiving an enabling signal. For example, a laser diode is energizable to emit a beam of laser light.

As used herein, the term "localized light source" relates to a source of light having a known and predetermined coordinate location; the localized light source can act as a point source or can be a feature at a spatial location that is substantially point-like in appearance with respect to an imaging apparatus. Alternately, the localized light source may be extended in size. Significantly, for the purposes of the present disclosure, the localized light source has at least one "ground-truth" coordinate (e.g. depth). Some examples of localized light sources include a 50 nm fluorescent bead and a 1 mm LED.

In the context of the present disclosure, the term "approximately", when used with reference to a measurement, means within expected tolerances for measurement error and inaccuracy that are accepted in practice. Some reasonable tolerance must be allowed, for example, for measurement differences and for the precision required in a particular application.

In the context of the present disclosure, the term "engineered point spread function (PSF)" relates to an aspect of an optical system that modifies the conventional (also termed "Airy disk") point spread function by manipulating wavefront, phase, or other light characteristic.

It is known that differences in the refractive index between the medium in which the object is present and that of the imaging lens objective lead to discrepancies between the apparent and actual depth of the object. Further systematic effects may also be present which alter apparent positions of objects from their actual, or "ground-truth", positions. These effects can lead to depth-dependent, and even position-dependent, aberrations that can ultimately degrade the quality of the optical system. These effects can also vary with the emission spectrum and polarization of the observed object.

To quantify these effects, the Applicant's solution forms a three-dimensional structure as a target for use as an object for imaging by the optical system and provides a standard for optical system characterization. Two aspects of the 3D target structure are of particular significance:

(i) Dimensional. The 3D target structure should be of precise shape and dimensional arrangement, which covers some, or all, of the three-dimensional field of view of the imaging apparatus. With respect to spatial arrangement and dimensional metrics, this three-dimensional structure should be fabricated and measured to a higher level of precision than that achievable by, or sought from, the optical system, such that any inaccuracies of the fabrication process are significantly less than the apparent precision or resolution of the optical system. This aspect is particularly useful in so-called super-resolution microscopy techniques that can resolve features beyond the diffraction limit of light. Fabrication methods for the three-dimensional target can include photo-lithography, diamond turning, imprint lithography, injection molding, laser ablation, material deposition/growth, self-assembly, or other commonly used methods, for example. The three-dimensional target can include surfaces at multiple known depths across the three-dimensional field of view to allow for 3D characterization. To enable proper characterization of the entire three-dimensional field of view, the lateral profile and height/depth of the target structure should include features that cover the three-dimensional range of interest.

(ii) Localized light sources. The precisely dimensioned 3D target provides a stage or framework for positioning of localized light sources, spatially specific concentrations of light energy. Each of these localized light sources has a known spatial or positional coordinate dimension, such as a z-dimension with respect to depth distance from a base or other reference or along the optical axis, and serves as a spatial target for system characterization imaging. Individual localized light sources can be formed in a number of ways; sources can be point sources, for example, adhered to the target structure, or otherwise formed upon or through the staging surface or surfaces across the structure. Localized light sources can be emissive sources. Localized light sources can be dimensioned so that they exceed, equal, or are sized and/or spaced apart with dimensions that are below the diffraction limit of the optical apparatus being characterized. Examples of localized light sources include apertures formed on the target structure that provide one or more pin-hole sources, wherein the light energy itself is from an external illumination source; other localized light sources can include fluorescent beads, fluorescent dye molecules, fluorescent proteins, fluorescent nanodiamonds, gold nanoparticles, carbon nanotubes, quantum dots, and fluorescent or scattering or emitting material defects, for example. Fluorescent beads or diamonds could be localized light sources that serve as emissive point sources, disposed at specific, known intervals.

FIGS. 1A, 1B, 1C, and 1D show, in schematic form, exemplary arrangements of emissive localized light sources using a 3D target 40 with a microscopy system. For each of these figures, a microscope objective 12 is shown, along with an optional cover slip 16. It should be noted that the objective 12 can be an objective lens or some other type of objective, such as a lensless objective that uses shadow imaging, fluorescence, holography, super-resolution 3D imaging, or iterative phase recovery, for example. Lensless imaging approaches and apparatus rely on computational techniques to reconstruct image content from the raw data captured by digital image sensors.

In FIG. 1A, target 40 has a number of localized light sources 10, each formed onto a structure 20 that defines a target volume V with predetermined dimensions. Structure 20, formed as a cavity within a substrate 24 in the FIG. 1A-1D examples, defines a volume V with a set of staging surfaces 30 that position or seat the localized light sources 10 at discrete depths, with depth dimension considered to be in the direction of an axis z. A reference base 32 is also formed on structure 20 and can provide a base level, which serves as a reference for z-axis measurement orthogonal to the plane of the base level according to an embodiment of the present disclosure. Localized light sources 10 are individual light emitters in the embodiment shown. Each light source 10 of target 40 can be actuable or energizable to generate, fluoresce, or scatter light energy, for example. An optional immersion medium 44 can be used with target 40. Substrate 24 can be optically transparent or may be opaque.

Figure 1B:
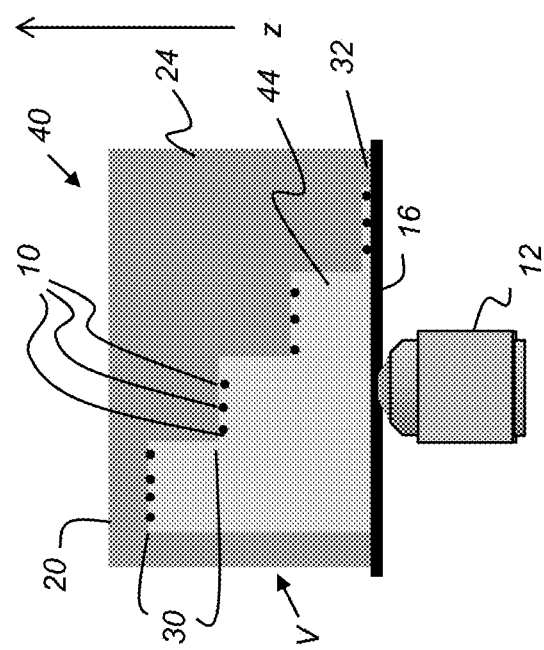

In FIG. 1B, localized light sources 10 are holes or apertures 22 formed in a coating 36, each aperture 22 providing a type of pin-hole source. Each hole or aperture 22, providing an aperture for light from an illumination source 14 that is external to target 40, can be dimensioned or spaced apart to sub-diffraction limits, for example. Illumination source 14 can be, for example, a solid-state source such as a laser or light-emitting diode (LED), gas lamp, incandescent lamp, or ambient light. Portions of opaque coating 36 can be retained without apertures, such as to block stray light. Substrate 24 can be optically transparent.

Figure 1C:
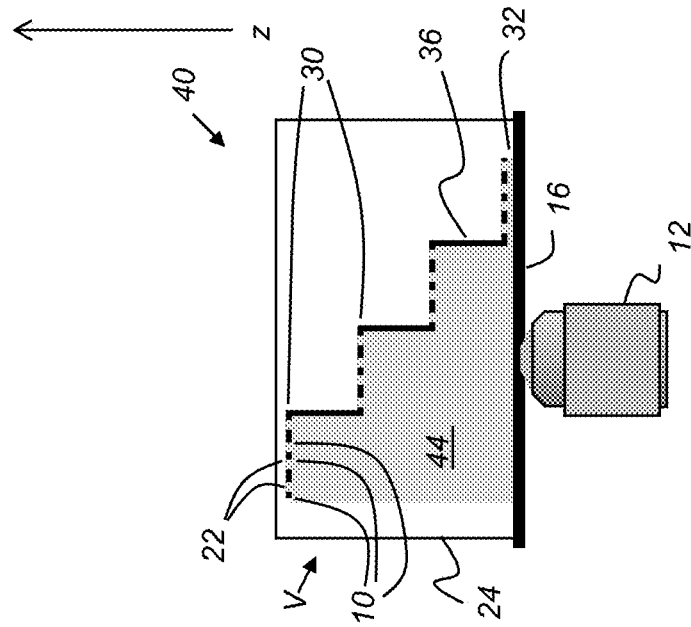

FIG. 1C shows a similar target 40 arrangement to FIG. 1B wherein light energy is provided by fluorescence. The fluorescent light can be from a material such as a protein, dye, film, object, or fluorescent substrate 18, as shown in FIG. 1C. Alternately, some other fluorescent material can be placed behind or within each aperture 22.

Figure 1D:
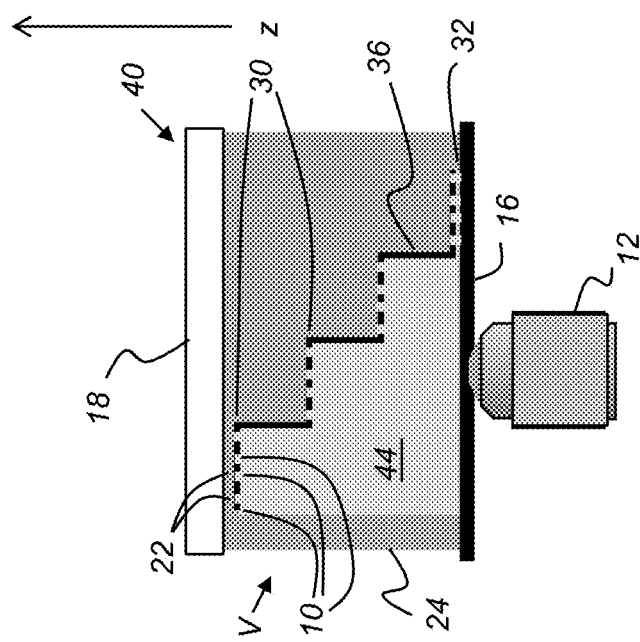
FIG. 1D shows a schematic for an exemplary target using localized light sources formed from excitation of a fluorescent substrate.

FIG. 1D shows an embodiment wherein a fluorescent or phosphorescent material is used as the substrate 24, with a coating 36 of a blocking material, such as chrome, having apertures 22 with predetermined diameter, such as a diameter in the range of about 100 nm, for example.

Often, the localized light sources used in the imaging target are smaller than the diffraction limit of the imaging system, in order to allow accurate representation of the point spread function (PSF) of the imaging system. It is important to note that the localized light sources need not be limited to fluorescent particles. For example, the localized light sources could transmit or scatter light from an external source, or actively emit light, or emit light through external stimulus. Moreover, it may be beneficial to use transmitted light formed by directing illumination through a grid of regularly spaced apertures in a blocking mask made from a suitably featured material such as metal or polymer.

If a known pattern of emitters were formed on the three-dimensional structure, then it would be also be possible to correct for other than depth-dependent aberrations. The material used as an optical medium 44 in the interstitial space between the three-dimensional target 40 and cover slip 16 can further be matched to the same optical properties used for a specific imaging experiment or modality. Thus, medium 44 could range from liquids, such as water, to more complex substances such as refractive index-matching adhesives, gels, or mounting agents.

To characterize the optical system, three-dimensional target 40 can be imaged under the same conditions intended for the experiment of interest. Using the known profile of target 40, obtained according to material and dimensional characteristics of the particular target 40, and the characterization of the imaging optical system, subsequent images taken by the optical system could be properly spatially restored, or the distortion field of the optical system could be calculated. The calculated distortion field could then be used to invert measured, systematic aberrations, and thus correct system measurements for the experiment of interest. Such restoration of the proper 3D spatial arrangement of collected data can be useful in any modality of 3D imaging, including but not limited to high-resolution wide-field microscopy, restoration microscopy, TIRF, confocal microscopy, single molecule localization microscopy, SIM, STED, and surface topology/depth imaging.

Furthermore, imaging a field of view with localized light sources in 3D throughout some, or all, of the desired depth of field could be used for obtaining images of the PSF as a function of depth. Thus, it could be used for characterizing the 3D PSF without the need for an axial scan.

Moreover, performing axial scan imaging of a field of view with localized light sources at a known depth across some, or all, of the field of view could be used for obtaining images of the PSF at different field-of-view locations. Thus, imaging of the target 40 could be used for characterizing the 3D PSF for more-precise spatially-variant localization or restoration microscopy, such as high-resolution deconvolution, confocal, light sheet, SIM, STED or other super-resolution imaging modalities.

Embodiments of the present disclosure describe apparatus and methods for characterization of an optical imaging system using image content obtained from the 3D target structure described. Notably, the methods and apparatus described herein can be used for characterization of optical systems that resolve features beyond the diffraction limit of light.

To fully quantify the distortion field of the optical system, target 40 of the present disclosure preferably covers the field of view (FOV) of the imaging system as well as its depth of field $D_{field}$. If this is not possible, the field of view can be covered by precisely scanning target 40 in the lateral direction. Assuming the detector is fully filled by the imaging system, the lateral field of view (in one dimension) can be calculated as:

$$FOV = \frac{\text{Detector Size}}{\text{System Magnification}}$$

This can define the minimum lateral extent of the three-dimensional structure of target 40; however, it may be desirable to create a larger target 40 to enable imaging a full field of view with a particular portion/sub-region of the structure, and/or to enable lower system magnifications to be characterized as well.

Similar to the FOV, the depth of field of the imaging system must also be determined. For a standard, "clear aperture", system this can be calculated, for example, using:

$$D_{Field} = \frac{\lambda * n}{NA^2} + \frac{n * \lambda}{2M * NA^2}$$

However, when an engineered point spread function (PSF) is used, the depth of field $D_{field}$ of the imaging system can be altered and must be theoretically or empirically determined based on imaging conditions. Furthermore, a number of advanced 3D imaging systems utilize the 3D properties of the system beyond the focal region, for which aberrations and distortions are not readily characterized.

To adequately quantify the depth-dependent aberrations of the system, it may be possible to form a calibration target 40 that uses multiple levels, with the levels substantially covering the entire depth of field of the optical system. Further, if the aberrations were assumed to be linear, there would only need to be two levels to quantify the system. However, as the aberration characteristics are not well known and are expected to be nonlinear beyond a certain depth, it is prudent to engineer a multi-level system to allow for the characterization of higher order aberrations. It should be noted that there is a tradeoff between the depth of the levels and the number of levels available for a single FOV. As the level "size" approaches zero, as in employing a sloped surface with respect to the base at horizontal, the number of levels is maximized and is only limited by the size of the localized light sources and by the desired spacing between the sources.

Target Fabrication

Embodiments of the present disclosure can form target 40 in a two-stage process: (i) a skeletal framework or base structure 20 is formed of a suitable substrate, featured to provide one or more staging surfaces at different positions in x, y, z space; (ii) the base structure is then populated to provide localized light sources 10, such as sub-diffraction point sources, with sources 10 distributed at suitable locations along the staging surface(s) with respect to the base structure. Any of a number of suitable techniques for populating the light sources 10 can be used, including pitting the surface to accept a fluorescing or other emitting material or deposition of an emitting material onto the surface, for example.

Base Structure Embodiment with Discrete Levels

Figure 2B:
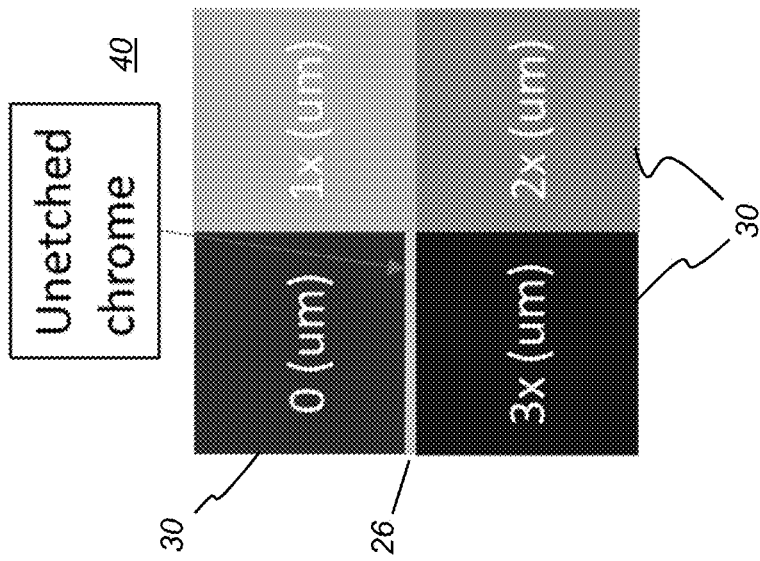
FIGS. 2A and 2B show side and top views, respectively, of a target in an embodiment that has a number of discrete staging surfaces.
Figure 2A:
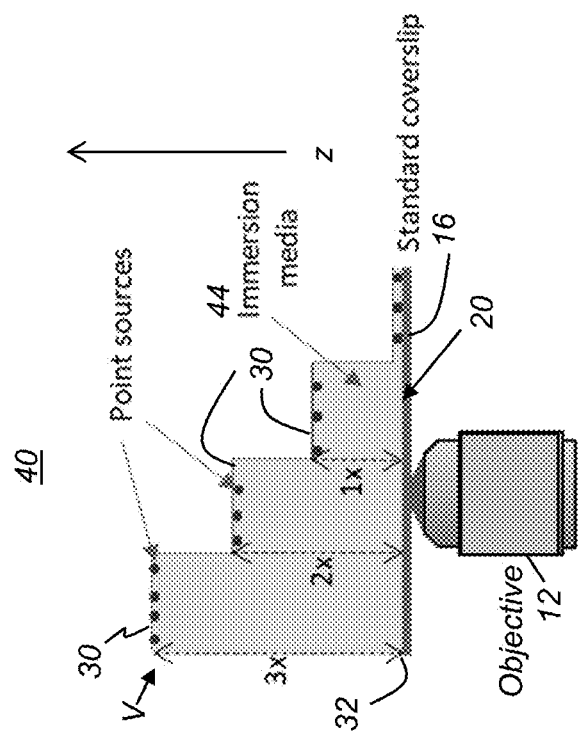

An embodiment according to the present disclosure forms a set of discrete staging surfaces 30, as shown schematically in the side view of FIG. 2A and top view of FIG. 2B. FIGS. 2A and 2B show an example of a 4-level three-dimensional structure 20 having a base 32, wherein the structure is featured using binary multi-step photolithography. This geometric arrangement allows up to cubic aberrations to be well characterized. Each level for staging surface 30 is at a discrete step with respect to an axis z; this allows each level to be large, such that a precise depth can be determined through statistical analysis of many localized light sources. It should be noted that the tradeoff between choosing large steps or choosing many steps is only an issue when the pattern of emitters 10 on the three-dimensional structure 20 is not known. If a known pattern were deposited or fabricated on the structure, then the structure could have many steps or could even be continuous (e.g. having a known slope), as each point location would be localized to a corresponding ground-truth location.

The fabrication method for structure 20 described herein uses multi-level binary photolithography. The photolithography fabrication process involves first converting the four-level pattern into two binary amplitude patterns.

Figure 3:
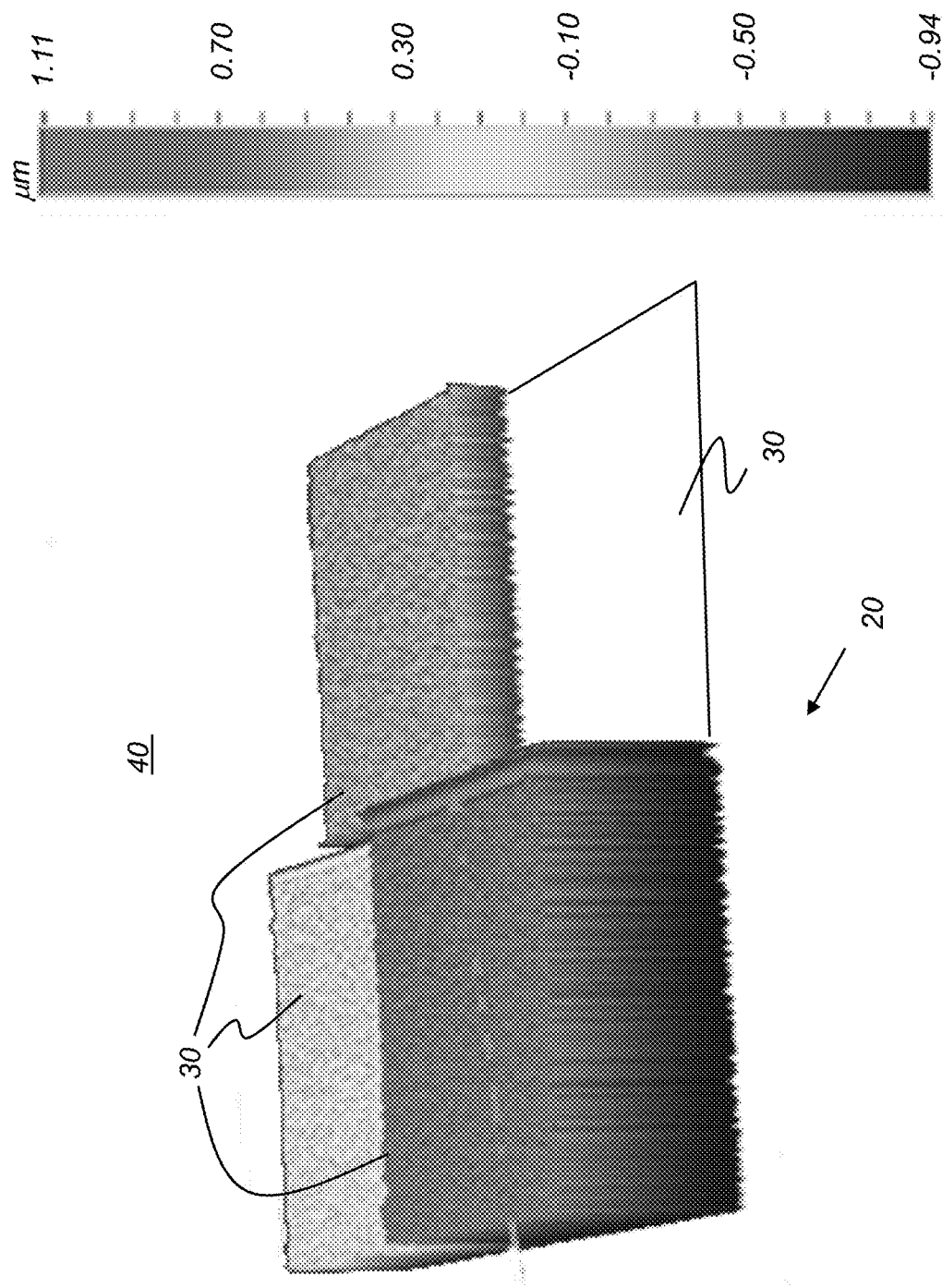
FIG. 3 is a perspective view showing profilometry measurements of a target with multiple staging surfaces at different levels.
Figure 4:
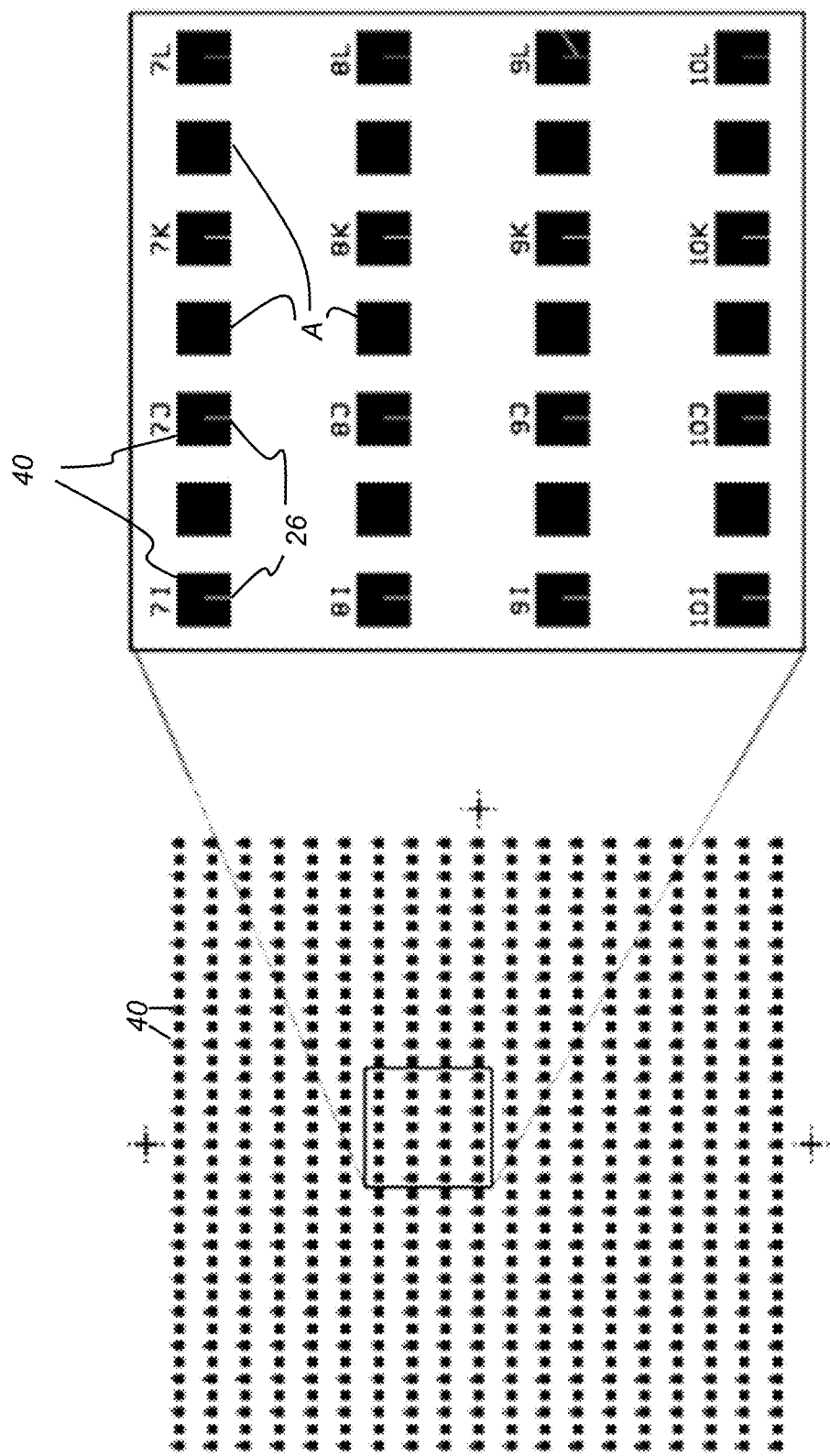
FIG. 4 is a plan view that shows an array of targets formed on a substrate.
Figure 5:
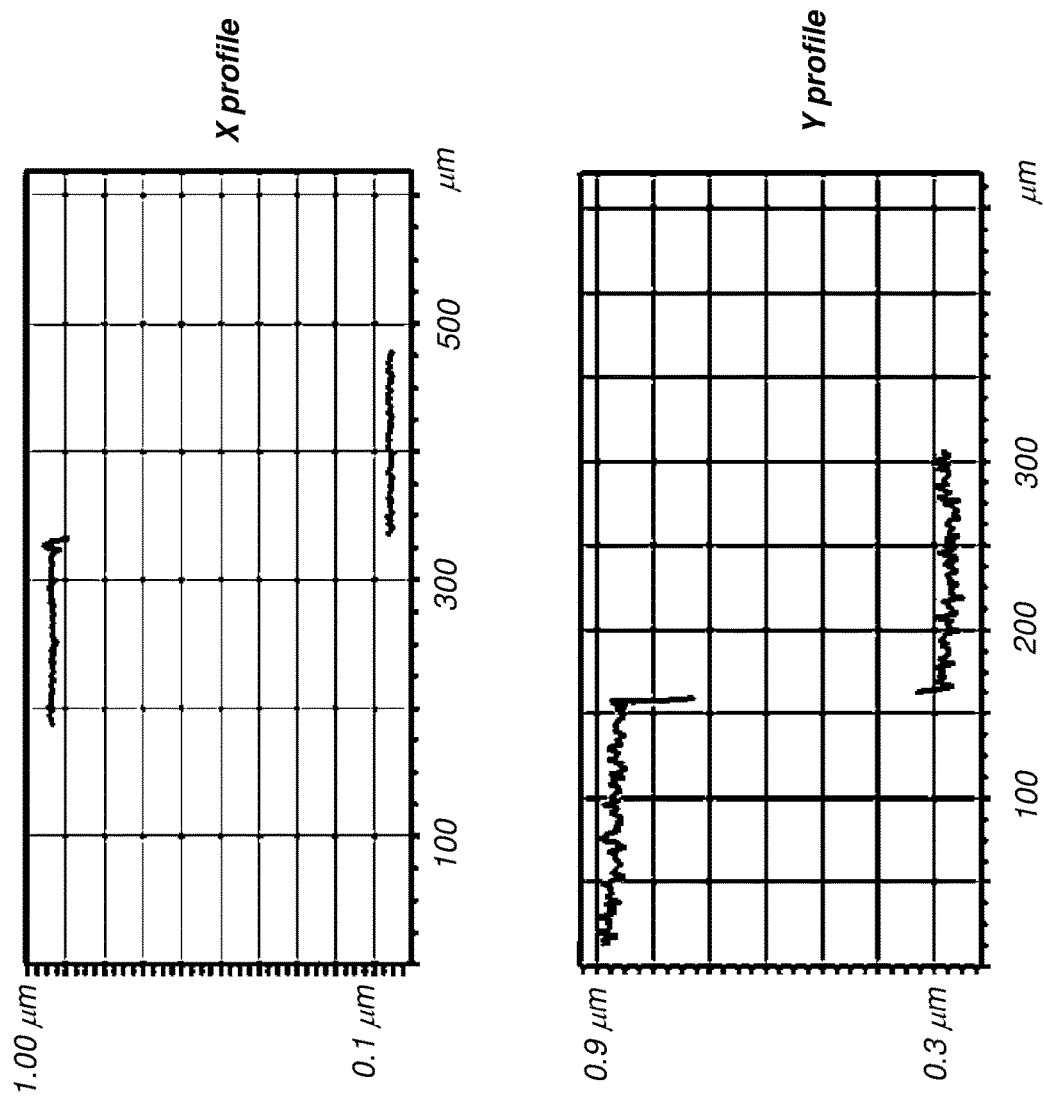
FIG. 5 shows metrology using white light interferometer results in standard orthogonal x and y coordinates.

FIGS. 3, 4, and 5 show various aspects and arrangements of the structures 20 that can be fabricated. FIG. 3 is a perspective view obtained using white light interferometry of a single 4-level 3D structure.

FIG. 4 is a plan view that shows an array of targets 40 formed on a substrate. The array can be formed, for example, on a slide. Labeled areas (for example, 7K, 7L, 81, etc.) indicate targets 40. Unlabeled areas A are provided to facilitate tilt correction.

Metrology (e.g. white light interferometry) is used to accurately measure the surface contour of structure 20 following fabrication and prior to populating or treating the staging surfaces 30 with localized light sources 10. FIG. 5 shows exemplary profilometry results in standard orthogonal x and y coordinates for a section of structure 20 as shown in FIG. 3.

Fabrication can be performed in a number of ways. According to an embodiment, a quartz substrate having a thin layer of chrome (~20 nm) is spin-coated with positive photo-resist on the deposited layer. This side is then exposed and developed to provide a pattern having multiple square apertures formed into the chrome layer. The chrome aperture blocks any ambient background light, as well as allowing for easy location of the three-dimensional structure(s) 20.

A layer of chrome in the form of a thin bar (for example, 20 um wide) can be maintained as a registration mark 26 (FIG. 2B) between the highest and lowest levels of the structures formed in order to allow for easy identification of the center and orientation of the three dimensional features during the image acquisition process. The calibration target 40 is fabricated within this clear aperture.

To fabricate the three-dimensional target in a particular embodiment, the clear aperture can be spin-coated with a photo-resist and UV exposed with the first binary pattern and developed. It can then be etched for a desired amount of time to feature the quartz substrate to the required height. The photo-resist is then washed off and the same process repeated for the second binary pattern, after which the final 4-level structure etched in quartz is obtained. Proper alignment marks were made to precisely align the binary patterns for UV exposures with the previous exposures.

The surface profile of the fabricated 4-level structure can then be measured using a profilometer, such as using a white light interferometer. The profilometer measurement shows high surface flatness of the etched pattern, as exhibited with respect to x- and y-axis directions in the example of FIG. 5.

Base Structure Embodiment with Sloping Surface

Multi-level binary lithography is limited by the number of discrete levels that can be achieved due to the increased misalignment probabilities with increasing number of binary masks. However, this limit can be overcome using gray level lithography where the photoresist is exposed to the right amount of dosage and then developed to achieve the required height at each pixel. Thus, by precisely calculating the ratio between the etch rates of the photoresist and SiO2, it is possible to transfer the pattern onto the substrate.

Figure 6B:
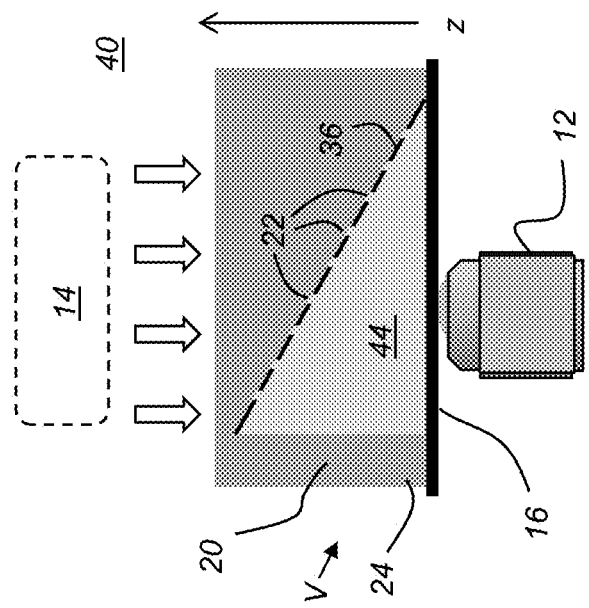
FIGS. 6A-6D are side views showing use of a base structure as a substantially continuous sloping surface according to an alternate embodiment of the present disclosure.
Figure 6A:
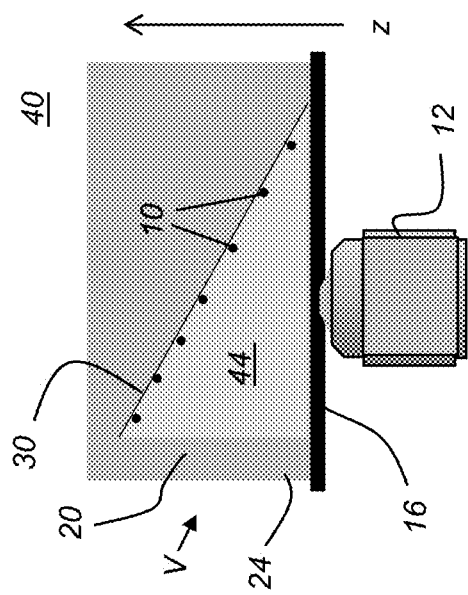
Figure 6D:
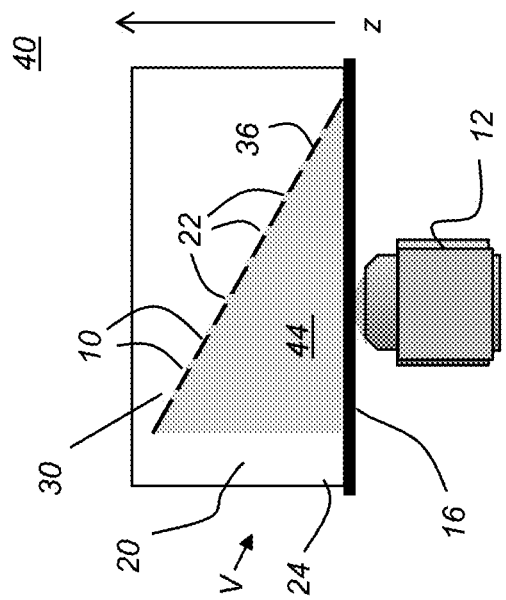
Figure 6C:
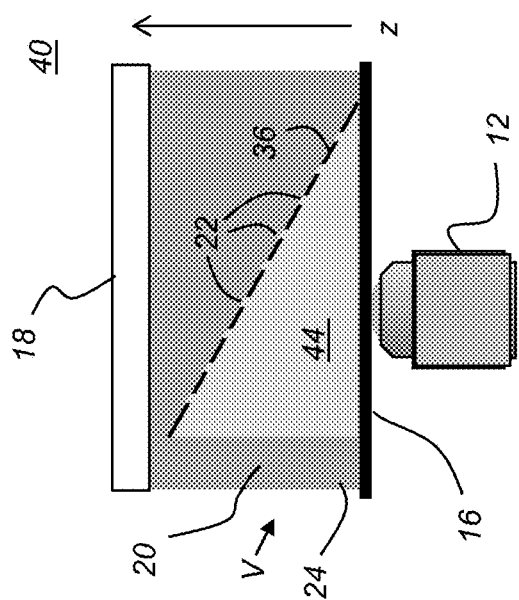
Figure 7:
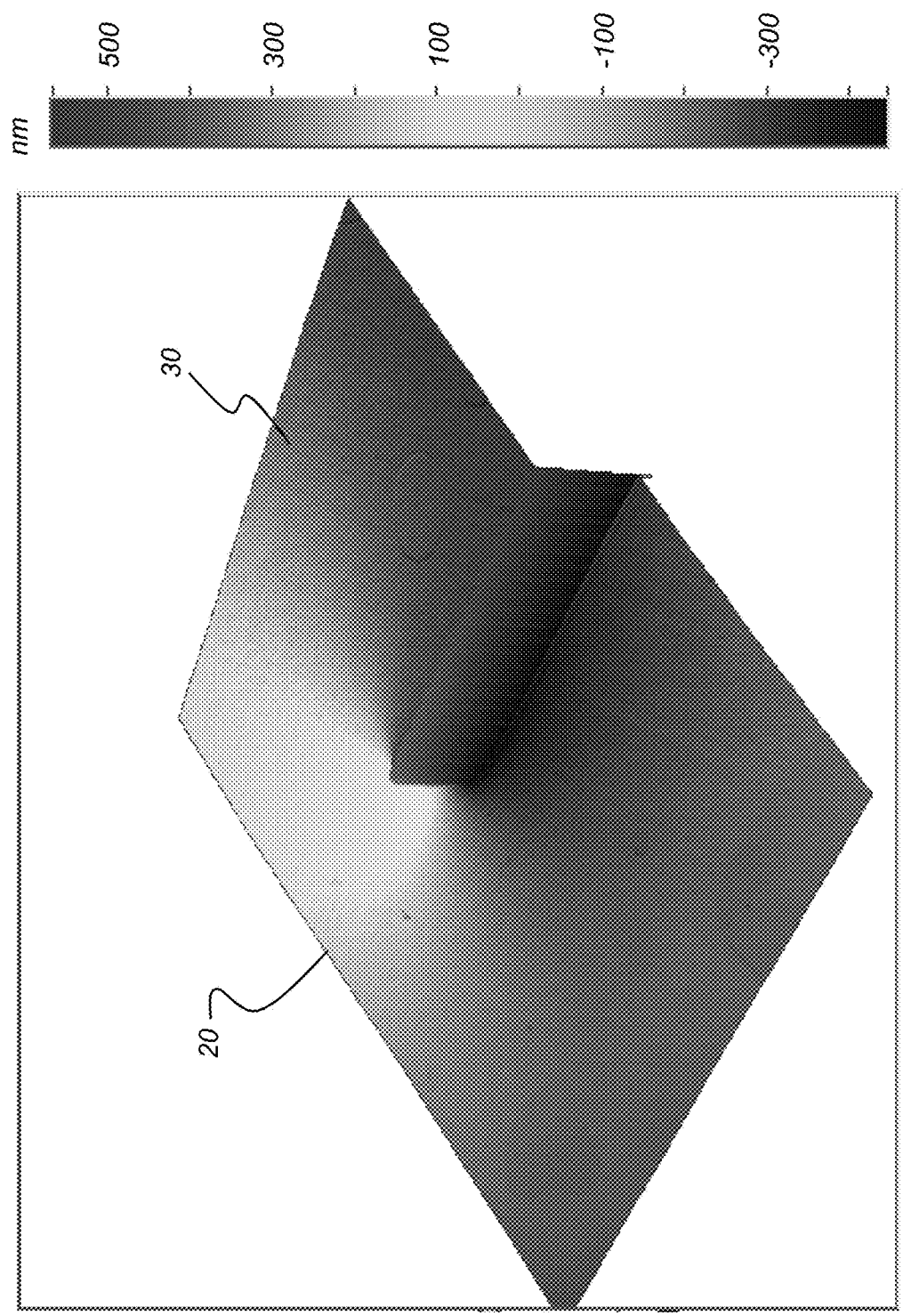
FIG. 7 is a perspective view showing the embodiment of FIG. 6.

An alternate embodiment employs gray-level lithography to form base structure 20 with a substantially continuous sloping surface 30, as shown schematically in the side views of FIGS. 6A-6D and in perspective view in the example of FIG. 7.

FIG. 6A shows target 40 in which structure 20 has a cavity with a sloped staging surface 30 for disposition of localized light surfaces 10. Optional immersion medium 44 can be used with target 40. Substrate 24 can be optically transparent or may be opaque for the embodiment shown. Localized light sources 10 can be emissive or scattering, for example.

FIG. 6B shows an alternate embodiment with sloped staging surface 30. In this arrangement, localized light sources 10 are holes or apertures 22 formed in a coating 36, each aperture 22 providing a type of pin-hole source. Each hole or aperture 22, providing an aperture for light from an illumination source 14, can be dimensioned to sub-diffraction limits, for example. Illumination source 14 can be, for example, a solid-state source such as a laser or light-emitting diode (LED), gas lamp, incandescent lamp, or ambient light. Portions of opaque coating 36 can be retained without apertures, such as to block stray light. Medium 44 is optically transparent.

FIG. 6C shows a similar target 40 arrangement to FIG. 6B using fluorescence from film 18 to provide light energy to apertures 22 in coating 36. The fluorescent light emission can be from a protein, dye, film, object, or fluorescent substrate 18, for example. Alternately, some other fluorescent material can be placed behind or within each aperture 22.

FIG. 6D shows an embodiment wherein a fluorescent or phosphorescent material is used as the substrate 24, with a coating 36 of a blocking material, such as chrome, having apertures 22 for forming an array of localized light sources 10.

Once formed, the surface profile of the 3D structure can then be measured under a profilometer to ensure that the surface quality and steepness matches the design parameters.

Figure 8:
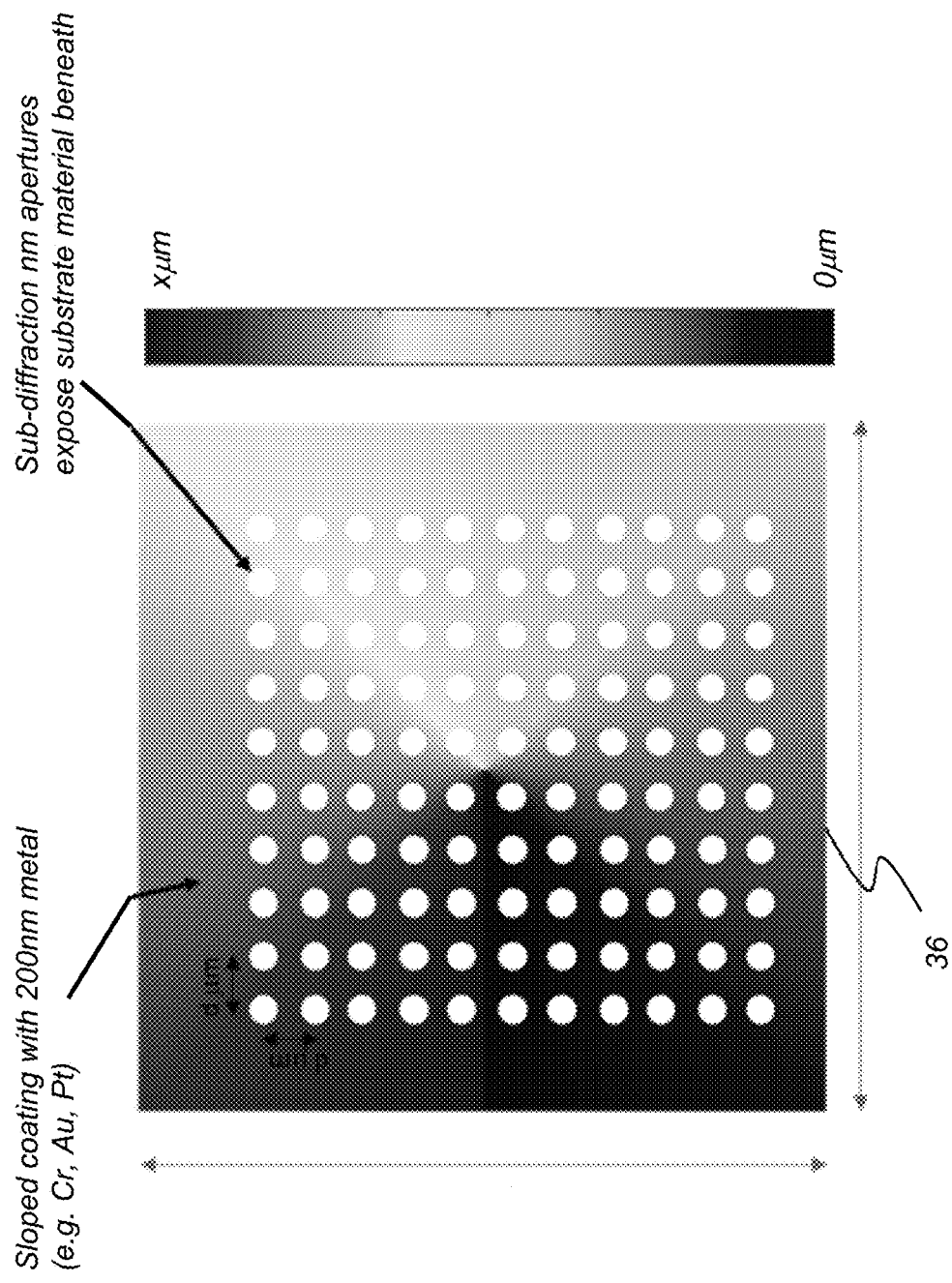
FIG. 8 shows an apertured coating that can be formed on a surface for localized light sources within a target.

The continuous slope of surface 30 in the FIGS. 6A-7 embodiment allows characterization of system optics at a high sampling rate in three dimensions. FIG. 8 shows an apertured coating 36 that can be applied to surface 30 and treated as described subsequently for accurate location of localized light sources within a target.

Forming Sub-Diffraction Apertures 22 on the Staging Surface 30

An array of sub-diffraction apertures can be provided on staging surface 30 by applying and treating an opaque coating, removing material to form each aperture. Once the 3D base structure 20 is created, a 200 nm thick layer of light blocking material (ex: materials Cr, Ag, Pt, Au, etc.) is deposited on the 3D structure. A known array of sub-diffraction apertures 22 is then milled, etched, or otherwise formed into the 3D structure.

The plan view of FIG. 8 shows an exemplary arrangement of milled apertures 22 in coating 36 used for the surface 30 described with reference to FIG. 7.

It is important to note that the size of the holes providing the apertures 22 and their density is decided based on factors such as the numerical aperture of the imaging system and the point spread function being used.

Depositing Localized Light Sources as Targets

As was described with reference to FIGS. 1A-1D and 6A-6D, alternative approaches form localized light sources 10 as sub-diffraction sources by depositing emitters on the staging surface 30 of structure 20. For the 4-level 3D structure according to an embodiment of the present disclosure, fluorescent beads, such as 100 nm Tetraspeck™ Microspheres (Thermo Fisher Scientific, T7279) were chosen as the imaging points.

According to an alternate embodiment of the present disclosure, there is provided an imaging target having one or more surfaces, wherein one or more localized light sources is formed on or coupled to a surface of the target for imaging.

Any of a number of methods known to those skilled in the art can be used for bead deposition and distribution on the staging surface. Typical steps involve dilution and aggregate break-up, deposition, and drying, using any of a variety of suitable techniques. Surface preparation can include pitting or otherwise conditioning localized points along the surface for adhesion or other coupling of the emissive or fluorescent material. Once beads are dried in place, a coverslip is applied, typically enclosing and sealing beads in place, such as in an optical medium that is suitably matched to the experimental/sample conditions. Optical media used in this preparation can include various low-viscosity liquids and adhesives having suitable refractive indices.

Considerations for Matching Optical Properties

A primary need for a three-dimensional calibration target 40 comes from the apparent versus actual depth difference due to differences in the refractive index between the mounting (sample) medium and the objective (immersion) medium. For many imaging modalities, oil, water, or silicone immersion objectives are used. The oil typically has an index of refraction $n_{oil} \approx 1.518$, while a sample may be mounted in a medium ranging in refractive index n from 1-1.52, or even higher. Any difference between sample mounting refractive index (RI) and objective immersion RI leads to an apparent depth difference of light emitters at various actual depths into the sample. Therefore, it is important to characterize the effect of the RI difference between the sample and the lens. For a given depth change $\Delta Z$, the difference in change of apparent depth $\Delta Z_{apparent}$ when two different media are used in an imaging system can locally be described as:

$$\Delta Z_{Apparent} = \frac{n_1}{n_2} * \frac{\left(1 - \left(\frac{n_1}{n_2}\sin\theta_1\right)^2\right)^{\frac{1}{2}}}{\cos\theta_1} * \Delta Z$$

wherein $n_1$ and $n_2$ are the respective refractive indices for media 1 (i.e. coverslip) and 2 (i.e. mounting media) and Θ is the angle of the marginal ray. It has been observed that this equation cannot be used to directly calculate a scaling factor along the entire optical axis due to its strong dependence on Θ. (Reference: Alberto Diaspro, Federico Federici, and Mauro Robello, "Influence of refractive-index mismatch in high-resolution three-dimensional confocal microscopy," *Applied Optics* 41, 685-690 (2002)).

Considerations for Imaging with Engineered PSF

Wavefront coding systems provided by introducing a PSF engineering module or a phase masks into the light path, can form an extended depth of field as compared to a clear aperture system. This extended depth of field enables imaging a larger sample depth in a single image but creates an even greater need to fully characterize the three-dimensional field of view to correct for aberrations and distortions.

The combination of a known three-dimensional structure imaged with an engineered point spread function, such as the Double Helix Point Spread Function (DH-PSF) (Pavani & Piestun, 2008), enables single shot depth characterization. Through the use of a ground-truth depth sub-diffraction point source (particle, nano-hole, etc.) on the surface of a three-dimensional structure and the ability of the engineered PSF to directly indicate apparent emitter depth over an extended distance, the characterization of apparent to actual depth can be determined.

The use of broad-spectrum-emission point source emitters enables characterization of multiple emission wavelength bands. Subsequently, the apparent depth characterization could be used to restore the depth information for each emission wavelength to match the ground truth scale and thus align data from multiple emission wavelengths to each other.

Depth Determination

Depth can be calibrated for the DH-PSF, for example, by fitting a double-Gaussian function to the PSF at each quantized step through a range of Z (depth) positions. Steps are typically evenly spaced and are known up to the accuracy and precision of the microscope's axial positioning system (e.g. a piezo stage). The angle at each step can be measured from the fitted Gaussian center positions of each lobe in the PSF, and a relationship can be drawn between angle and physical Z position.

For 3D localization of an emitter using the DH-PSF, the PSF can be again fitted to a double-Gaussian function and the angle between the dual PSF lobes can be calculated from the fitted information. The Z position can then be determined by interpolation of the calibrated Z position vs. angle relationship. The resulting depth determination is then relative to the in-focus depth of the objective.

Field of View Characterization

In an optical imaging system, such as a microscope, there are distortions across the field of view such that the field of view does not appear "flat". Curvature, especially at the edges, can provide the appearance of changes in depth, and there can be local distortions across the field of view as a result of optical aberrations. A regularly, or irregularly, spaced field of sub-diffraction limit point source emitters in the desired emission wavelength(s), spread across the field of view, can be used to characterize the field of view "warp". If the target field of localized light sources is constructed on a known flat surface, such as a microscope coverslip, it could then be assumed that the resulting characterization of the warp could nominally be analytically leveled to undo any tilt (wedge) between the target and the optical axis. The resulting un-tilted warp characterization could then be used to flatten a field of view of the imaging system (i.e. to undo the warp distortion).

Tilt Correction

It is important to correct the imaged three-dimensional structure for tilt induced by improper alignment between the target 40 sample and the optical axis of the imaging system. With reference to FIG. 2A, the optical axis of the imaging system should be orthogonal to the substrate surface, such as shown by the z axis, orthogonal to base 32 of structure 20.

Figure 9:
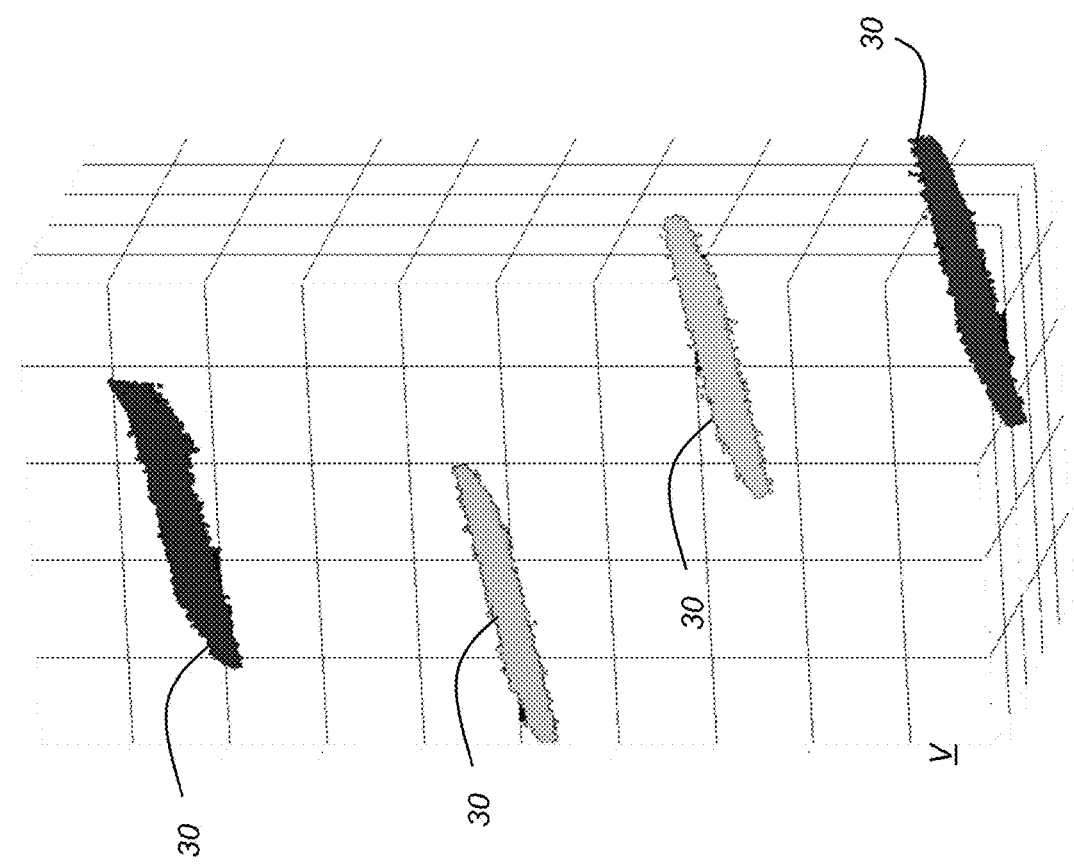
FIG. 9 shows, in exaggerated form, tilt obtained for un-processed imaging results obtained using the target in the embodiment shown generally in FIGS. 2A-3.

The perspective view of FIG. 9 shows, in exaggerated form, un-processed imaging results obtained using target 40 in the embodiment shown generally in FIGS. 2A-3. Each of the four staging surfaces 30 exhibits significant tilt, due to misalignment of a slide or other vehicle serving as a holder for target 40.

To determine tilt, a flat reference area on the target (e.g. immediately adjacent to the three-dimensional structure) is also imaged. For example, the array arrangement of FIG. 4 has areas A assigned as reference areas for tilt measurement. Alternately, a region of the 3D structure itself can be used for tilt measurement. This requires localized light sources to also be present on the flat area, and for the flat region to be large enough to cover the desired area of the field of view.

Using fluorescent bead application as described previously, treatment of a reference area A can be accomplished by allowing the distributed beads to cover the areas of the 3D target outside the 3D structures (e.g. between the wells) also, and thus, multiple flat regions in between the wells can be covered with beads. This area is imaged with, for example, the DH-PSF, which allows precise depth recovery across the three-dimensional field of view. The recovered depth profile across the field of view can then be used to characterize tilt using a mathematical function.

As such, the low order aberration (tilt) can be reliably corrected for; higher-order aberrations may also be corrected for in this way, as is done in field of view characterization, if there is sufficient sampling of localized light sources across the field of view. Once the tilt of the target is determined, it can be used to correct for the same tilt present in the three-dimensional structure 40, thus improving the overall characterization of the three-dimensional field of view.

Level Determination (Cluster Analysis)

Figure 11:
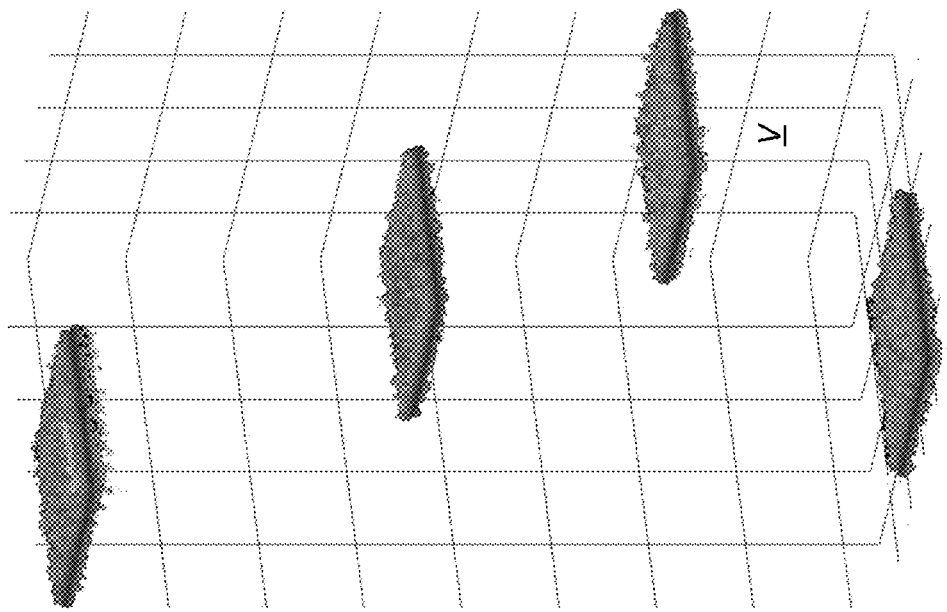
FIG. 11 is a perspective view that shows staging surface levels for the exemplary target of FIG. 10.
Figure 10:
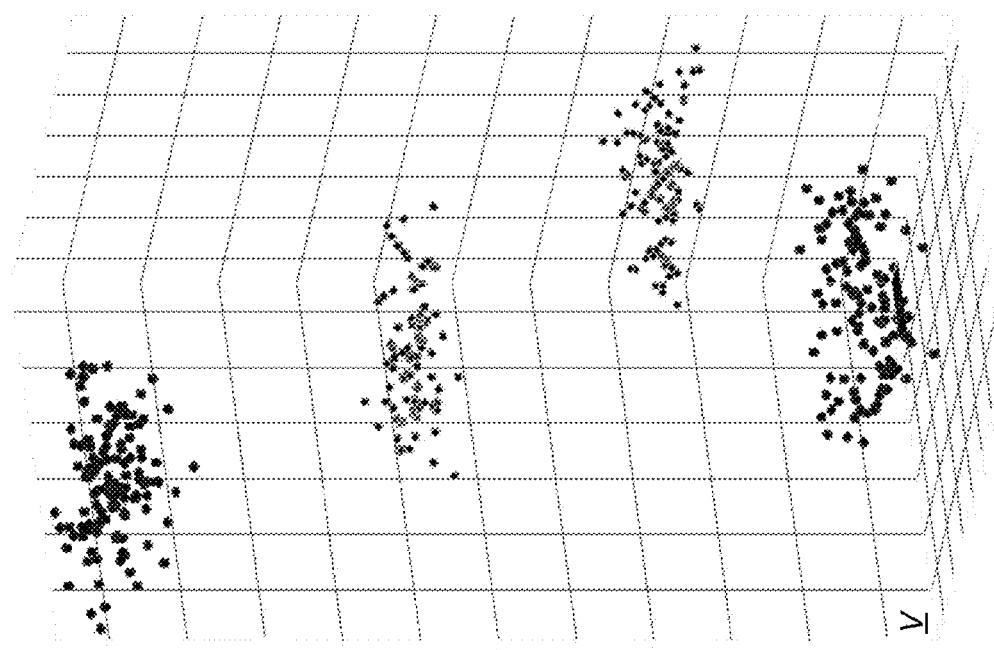
FIG. 10 is a perspective view that shows clustered point source localization data for an exemplary target.

FIGS. 10 and 11 show clustering of imaged point source data and surface 30 detection for the target 40 of FIG. 3 in an exemplary embodiment.

While it is possible to determine the individual levels of surfaces in the three-dimensional structure manually or algorithmically, and to section them accordingly, this requires a high-level of user input or a feature-recognition algorithm. It is much faster and more repeatable to determine the levels based on clustering. As there is a priori knowledge of the system (e.g. as a set of discrete levels), tools such as k-means cluster analysis can be used to identify the levels.

To do this, the target 40 data can be processed by undoing FOV tilt and warp (as described previously) from the 3D structure results. Subsequent k-means clustering, with value k set to the number of staging surfaces 30 present, can be used to segment the depth data into unique sets. While this clustering could be carried out in the x-y-z basis, due to the large discrepancy between lateral and vertical extent (lateral FOV ~130 μm vs. DOF of ~3 μm) it is better to use only the depth data such that the clusters are not unduly influenced by the lateral extent of individual surfaces.

After clustering, the data can be filtered to reject outliers. While manual or other algorithmic approaches to outlier rejection would be effective, outliers can be identified based on the spatial distribution of each staging surface 30 level. For example, recovered positions which are more than 1.5 interquartile ranges outside of the upper or lower quartile can be discarded. This works particularly well with the level data, as the positions are not normally distributed around a central location. Another method for outlier rejection is to determine outliers based on the average nearest-neighbor distance and remove points which are significantly distant from their nearest neighbor.

Figure 12A:
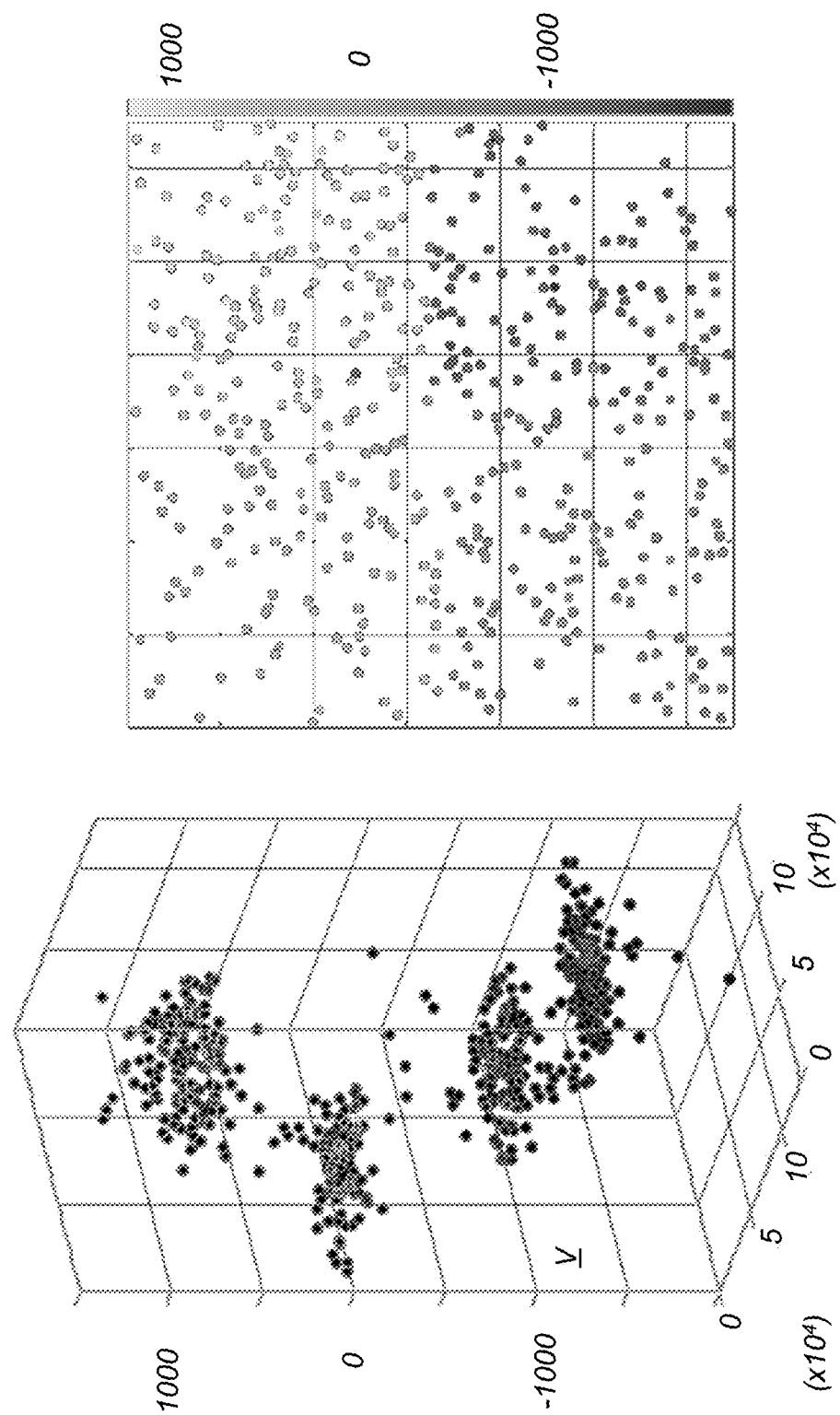
FIG. 12A shows distribution of exemplary target data prior to clustering and outlier removal.
Figure 12B:
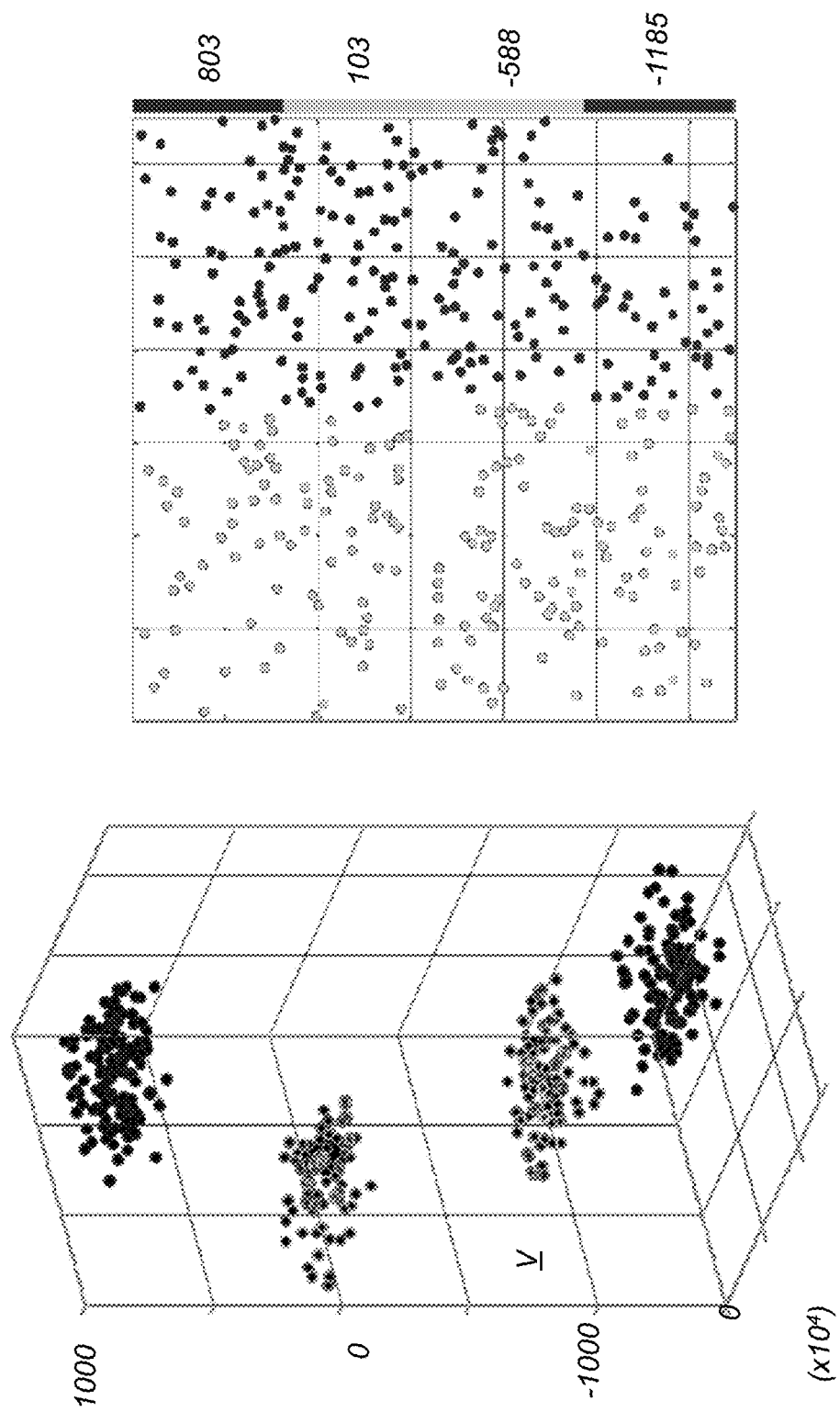
FIG. 12B shows the target data distribution of FIG. 12A following clustering and outlier removal.

By way of example, FIG. 12A shows the target data distribution within volume V prior to clustering and outlier removal. FIG. 12B shows the target data distribution following clustering and outlier removal.

Once the levels are clustered, and the outliers rejected, statistics on the levels can be calculated. For example, the mean (or median) depth of each plane surface is calculated along with the Median Absolute Deviation (MAD). For the current data set, according to an embodiment which has 4 levels and about 400 localizations, the Median Absolute Deviation value at each level was calculated to be about 40 nm.

Depth Correction Factor

To determine an apparent-to-actual depth correction relationship, the step size between levels for staging surface 30 positions can be calculated and compared to the ground-truth results. In the current 4-level example, it is possible to determine a linear, quadratic, or cubic relationship between actual and apparent depth. It is possible to determine higher-order corrections if more levels are implemented. A linear correction factor is calculated as:

$$\Delta Z_{Factor} = \frac{\Delta Z_{Actual}}{\Delta Z_{Apparent}}$$

By way of example in one embodiment, the Applicant has determined this factor to be 0.8765. Further empirical work may refine this value.

Figure 13:
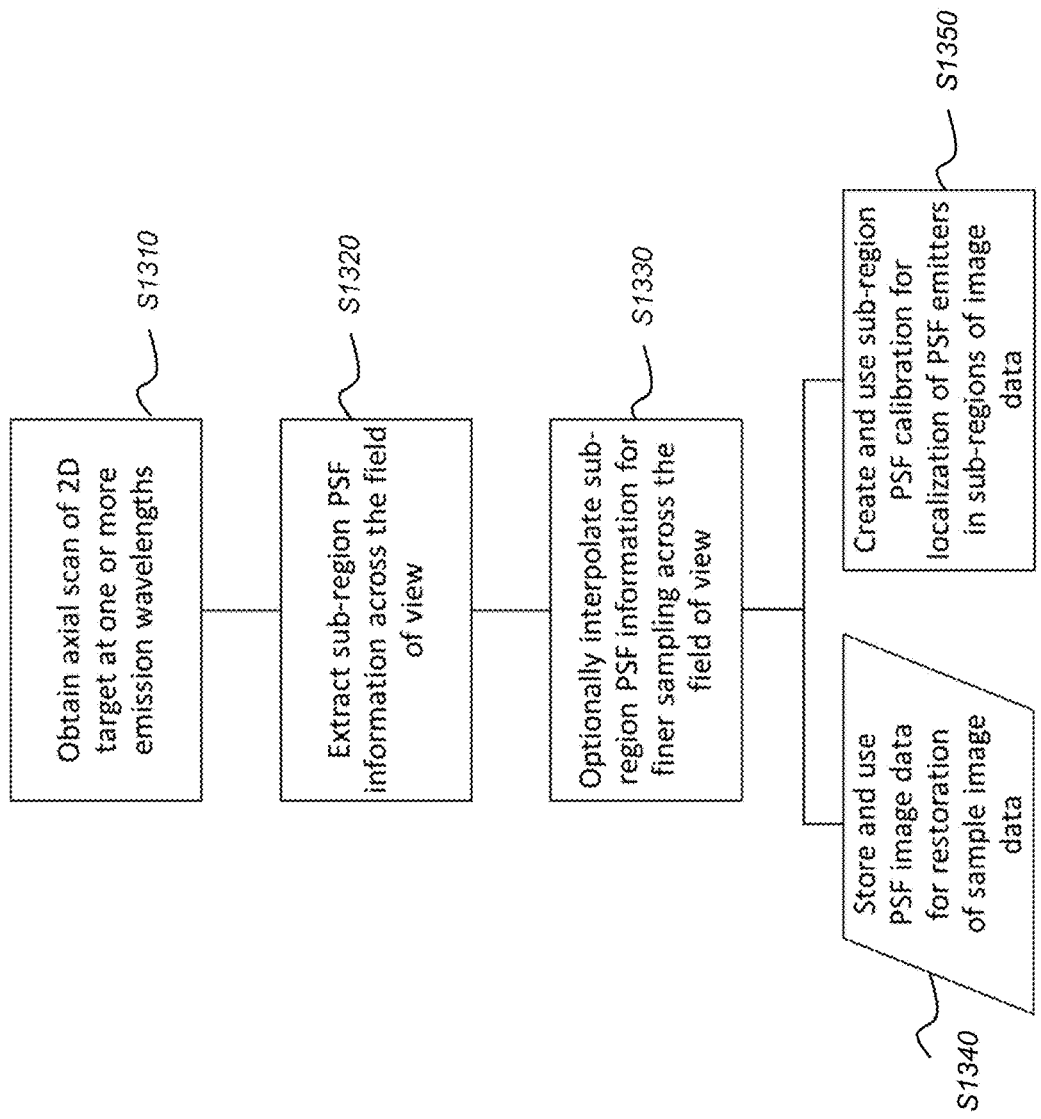
FIG. 13 is a logic flow diagram that shows an exemplary sequence for generating spatially variant (XY) PSF characterizations (i.e. lateral sub-regions) and using those characterizations in restoration or localization processing.

FIG. 13 is a logic flow diagram that shows an exemplary sequence for creating spatially variant (XY) PSF characterization (i.e. lateral sub-regions) and using those several characterizations in restoration or localization processing. An acquisition step S1310 acquires an axial scan of a 2D target at one or more wavelengths. A sub-region extraction step S1320 extracts the sub-region PSF information across the field of view. An optional interpolation step S1330 computes finer resolution sampling across the field of view. A storage and use step S1340 stores and uses the PSF image data for sample data restoration, or a PSF calibration step S1350 then creates and uses a sub-region PSF calibration for localization of PSF emitters in sub-regions of image data.

Figure 14:
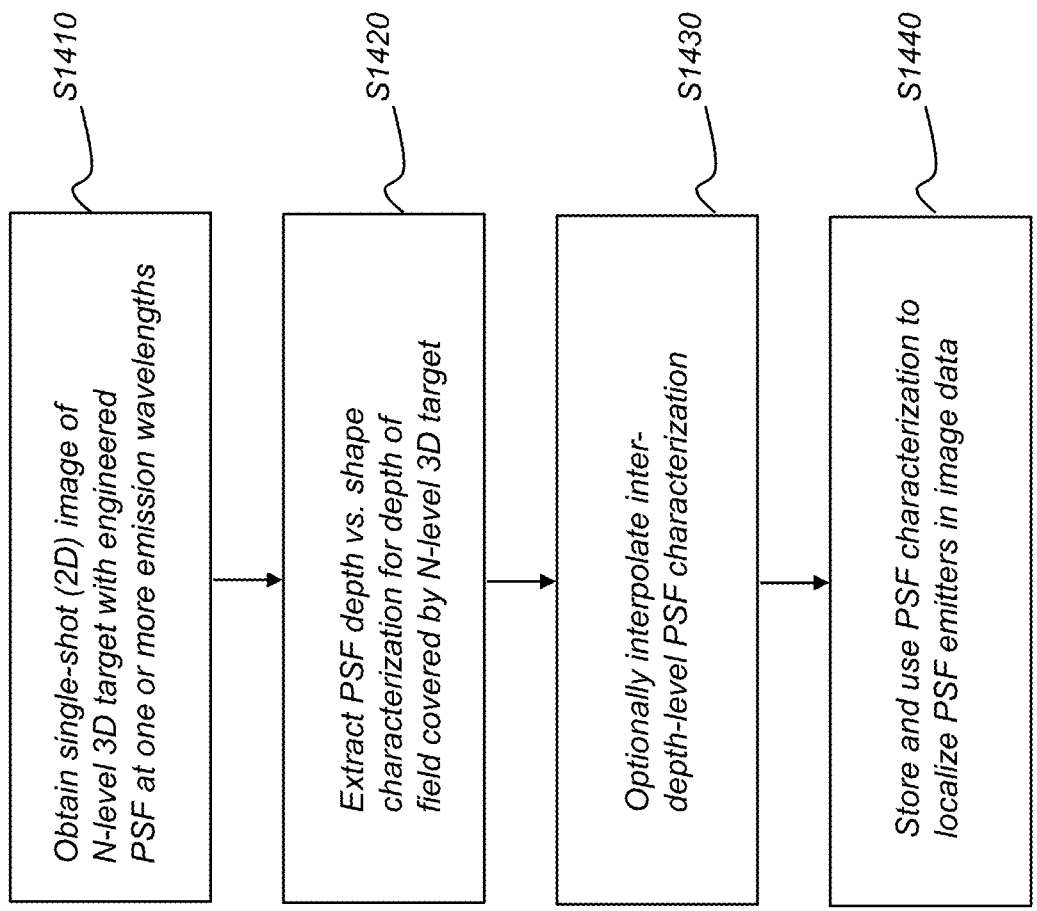
FIG. 14 is a logic flow diagram that shows a sequence for generating a single depth-dependent PSF characterization from a single-shot 2D image acquisition.

FIG. 14 is a logic flow diagram that shows a sequence for generating a single depth-dependent PSF characterization from a single-shot 2D image acquisition. An acquisition step S1410 obtains a 2D image of the 3D target at one or more wavelengths. An extraction step S1420 extracts the PSF depth information, relative to a shape or angle characterization for the depth of field. An optional interpolation step S1430 interpolates depth-level PSF data. A storage and use step S1440 stores and uses PSF characterization data for sample data restoration or to localize PSF emitters within the image data.

Figure 15:
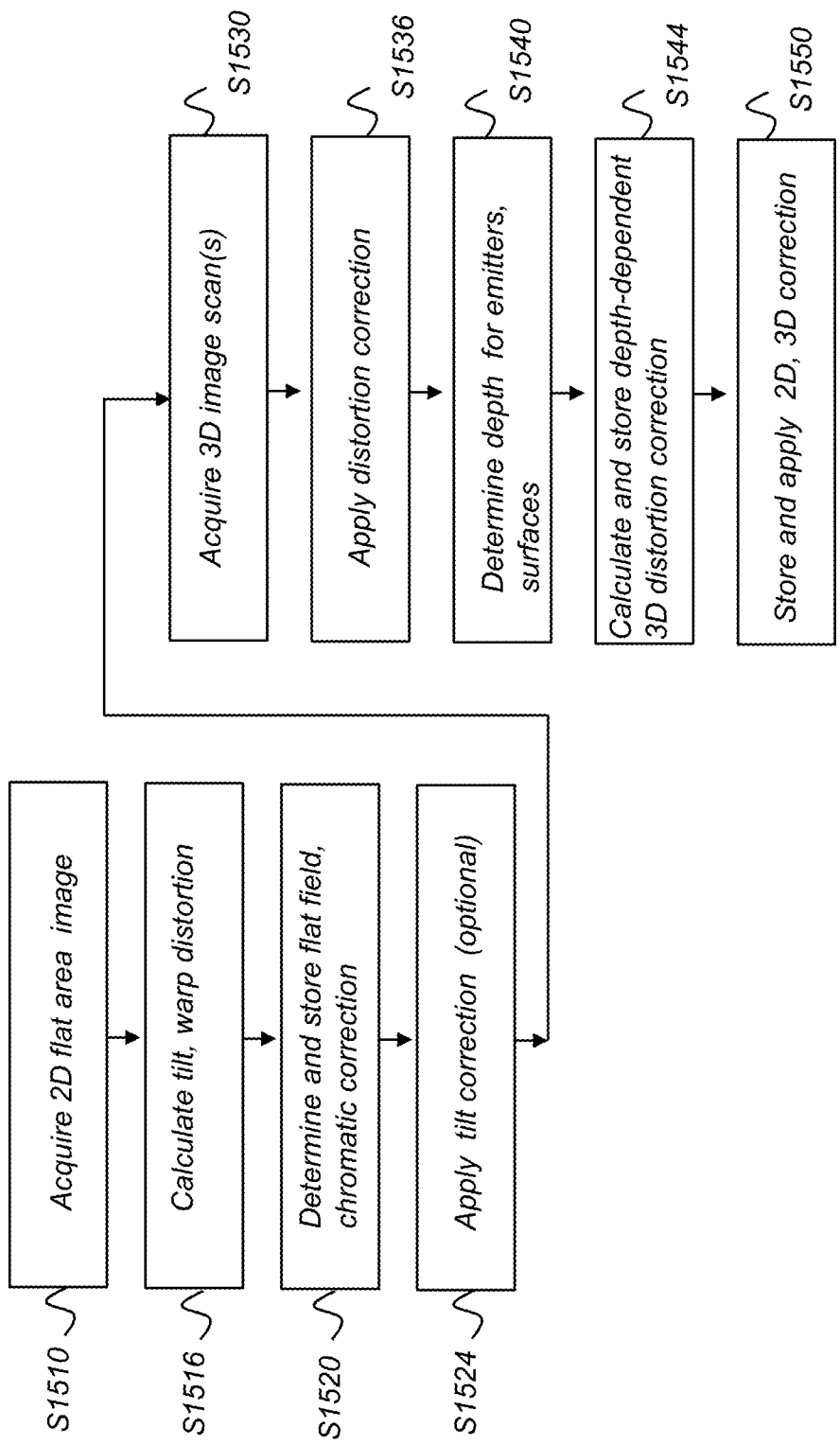
FIG. 15 is a logic flow diagram that shows a processing sequence for optical system characterization according to an embodiment.

FIG. 15 is a logic flow diagram that shows a processing sequence for optical system characterization according to an embodiment. In an image acquisition step S1510, an image of area A (FIG. 4) is acquired for characterization of aspects of distortion in the optical system. Initial steps characterize tilt and warp distortion. In subsequent processing, a calculation step S1516 calculates tilt and warp distortion for target 40 or its associated array. A correction determination step S1520 identifies chromatic correction for the optical system and stores the correction content. An optional tilt correction step S1524 corrects for tilt in the correction content.

Following the initial geometric characterization of steps S1510-S1524, the 3D characterization of the optical system is executed, using a priori information about the geometric arrangement of target 40. An image acquisition step S1530 acquires an image or image scans of a 3D target 40. A distortion correction step S1536 applies any calculated distortion correction from steps S1510-S1524 to the acquired image content or data extracted therefrom. A depth calculation step S1540 determines the depth value for localized light sources and thus their corresponding staging surfaces 30. Depth-dependent 3D distortion is then calculated and stored in a distortion correction calculation step S1544. A store and apply step S1550 then applies the needed 2D or 3D correction factors for the point source emitters.

The target can inherently be used for phase contrast imaging when fabricated using an optically transparent substrate. In this embodiment, the target would be used in transmission mode for a compatible imaging modality (differential interference contrast DIC, phase contrast, etc.) whereby the inclusion of the unique 3D optical substrate would provide the necessary optical path length difference required for phase imaging. These differences would be detectable by the chosen modality, and the relation between resulting phase difference image and the known optical path length change can be calibrated. This device could be similar to the device shown in FIG. 1B, but without the sub diffraction holes/mask (that is, all of the incident light transmits through the structure).

Additionally, the phase calibration of the transmitted light can be combined with other modalities (separate structures, same chip), such that using one calibration device, a multi-modal microscope could be calibrated.

Correlated Phase and Fluorescent Calibration Device

An embodiment of the present disclosure can provide correlated phase and fluorescent imaging characterization, useful for functions such as calibration of a multi-modality microscope. When using a transmissive substrate with emissive light sources, fabricated as described previously, the phase change resulting from changes in optical path length can be measured and used. By way of example, referring back to FIG. 1D, substrate 24 is optically clear, allowing transmitted light to pass through (from top to bottom in the FIG. 1D representation).

By imaging the path length differences created by variation in the thickness of the optical materials, or employing multiple indices of refraction, with staging surfaces of varying heights or depths in a phase-sensitive imaging arrangement, it is possible to impart a change in phase having a known pattern to the transmitted light in order to calibrate known optical path length differences to the observed changes in phase.

It is often beneficial to combine imaging modalities to improve the overall image or understanding of the imaged sample. In this embodiment, the calibration target can be used to consecutively, or simultaneously, and correlatively calibrate the phase imaging modality (such as phase contrast, DIC, tomographic, or other) with a fluorescent imaging modality, making it possible to correlate phase contrast images with fluorescent images. Without proper calibration between the phase contrast and fluorescent imaging modalities, it is not otherwise possible to achieve this correlation with a high degree of accuracy.

For the example of FIG. 1D, with substrate 24 as material 1 with index of refraction $n_1$ over distance $d_1$ and immersion medium 44 as material 2 with index $n_2$ and distance $d_2$, the optical path length OPL of combined medium 44 and substrate 24 can readily be computed as:

$$OPL = n_1 d_1 + n_2 d_2$$

Index of refraction n can either be constant or dependent on the position within the material; this index can also or alternately be dependent on environmental factors (such as wavelength of light, temperature, etc.).

It can be seen that the structure of target 40 imparts a change of phase to transmitted light according to a pattern of optical path length differences. One or more localized fluorescent light sources can be disposed along the one or more staging surfaces 30 of the structure and configured to direct light through or from the structure. Both phase change pattern and depth information related to the one or more fluorescent light sources can be obtained.

It should be emphasized that the multi-level example described with reference to FIG. 1D is one example where correlated phase and fluorescent characterization can be obtained. Other versions can be envisioned that include various steps or continuous level variation, or that use different indices of refraction n within a material.

According to an alternate embodiment for tomography, the angle of incident light and angle of observation can be varied for providing a difference in optical path length. This path length difference can be converted to a phase difference for an appropriate wavelength. The resulting pattern of phase changes can then be directly related to known depth distance and index changes to allow calibration in phase-contrast mode. The imaging platform can then be switched to a fluorescent imaging mode to image emitters on the staging surfaces. By determining the depth of emitters in fluorescence mode, and relating this back to the known depth distance, the imaging platform can be calibrated in fluorescence mode. Significantly, these calibrations, for the same device, now allow for phase-contrast and fluorescence imaging modalities to be calibrated to each other, so that results can be accurately compared and verified.

An embodiment of the present disclosure is an imaging target for characterization of an optical system, the target comprising: a) a structure, formed on a substrate, wherein the structure has a base level and has one or more staging surfaces spaced apart from the base level and disposed over a range of distances from the base level; and b) one or more localized light sources disposed along the one or more staging surfaces of the structure and configured to direct light through or from the structure.

A plurality of staging surfaces can be distributed over different levels. The staging surfaces can be embedded inside a transparent material. The structure can be covered by a second transparent structure. The substrate can be glass or quartz. One or more localized light sources can be formed by a grid of apertures illuminated by a light source. Apertures can be smaller than the diffraction limit for the optical system. The one or more localized light sources can be fluorescent. The one or more localized light sources can be emissive. The one or more localized light sources can scatter light. The one or more localized light sources can emit light through external simulation. The one or more localized light sources can be dimensioned according to resolution limits of an optical system.

Spacing between the one or more localized light sources can be dimensioned according to the resolution limit of the optical apparatus. There can be a single, flat staging surface and one or more localized light sources that lie on the same plane. The staging surface can be a single surface with a nonzero slope. The base can substantially occupy the field of view of the optical system. The range of distances can substantially subtend the depth of field of the optical system. The optical system can be a particle localization optical system. The optical system can be a quantitative imaging system. The optical system can be a computational imaging system.

According to an embodiment, an imaging apparatus can comprise: an imaging detector; an objective, that is physical or computational, that is actuable to form an image of a specimen on the detector; an imaging target disposed in the position of the specimen and comprising: a) a structure, formed on an substrate, wherein the structure has a base level and has one or more staging surfaces spaced apart from the base level and disposed over a range of distances from the base level; and b) one or more localized light sources disposed along the one or more staging surfaces of the structure and actuable to direct light through or from the structure.

The system can provide data having resolution beyond the diffraction limit of the optics. The system can have a diffractive optical element in a detection path. The diffractive optical element can form an engineered point spread function for the imaging apparatus. The engineered PSF can be a double-helix PSF or a tetrapod PSF. The system may include an estimator that is configured to map the detected location of the one or more localized light sources. The estimator can be unbiased. The estimator can flatten a field of view of the imaging apparatus. The estimator can correct for tilt of one or more staging surfaces relative to an optical axis. The estimator can characterize wavelength-dependence of the optical apparatus. The one or more localized light sources can actively emit light, transmit or scatter light from an illumination source, fluoresce, or emit light under external stimulus. The structure can have a relief or counter-relief with a number of different distances from the base. The structure can further comprise an array of apertures. The apertures can be dimensionally smaller than the diffraction limit of the optical apparatus. The base can substantially occupy the field of view of the optical system. The range of distances can substantially subtend a depth of field of the optical system, that is, the range can extend over at least 90% of the depth of field of the optical system. There can be a single, flat staging surface and one or more localized light sources lying on a plane. Spacing between the one or more localized light sources can be dimensioned according to the resolution limit of the optical apparatus. The optical system can be a particle localization optical system. The optical system can be a quantitative imaging system. The optical system can be a computational imaging system.

A method for characterizing a multi-modal imaging apparatus forms a structure on an optical substrate, wherein the structure has a base level and has one or more staging surfaces spaced apart from the base level, with points on the one or more staging surfaces disposed over a range of distances from the base level, wherein the structure imparts a change of phase to transmitted light according to a pattern of optical path length differences. One or more localized light sources, such as fluorescent light sources, can be disposed along the one or more staging surfaces of the structure and configured to direct light through or from the structure. A phase change distribution for the directed light can be measured and recorded. Both phase change pattern and depth distance information related to the one or more fluorescent light sources can be obtained. The measured phase change can be used to determine optical path length or refractive index. Characterizing the multi-modal imaging apparatus can comprise using tomography, such as diffraction tomography, projection tomography, or fluorescent tomography, for example.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. An imaging target for characterization of an optical system, the target comprising:
   a structure, formed on a substrate, wherein the structure includes a base and one or more surfaces, wherein the one or more surfaces include multiple surfaces spaced apart from the base and disposed over a range of distances from the base or a surface that is sloped relative to the base such that different points on the surface that is sloped are disposed over the range of distances from the base; and
   multiple point sources disposed along the one or more surfaces of the structure, wherein the point sources include at least first and second point sources disposed along the one or more surfaces at different distances from the base, each of the point sources having dimensions that are smaller than a diffraction limit of the optical system.

2. The target of claim 1, wherein the substrate is glass or quartz.

3. The target of claim 1, wherein one or more of the surfaces are in contact with a transparent material.

4. The target of claim 1, wherein the point sources are formed by a grid of apertures illuminated by an external light source that is spaced apart from the grid of apertures.

5. The target of claim 4, wherein the aperture inner dimensions are smaller than the diffraction limit for the optical system.

6. The target of claim 1, wherein the point sources comprise fluorescent light sources.

7. The target of claim 1, wherein the point sources comprise emissive light sources.

8. The target of claim 1, wherein the point sources are configured to scatter light.

9. The target of claim 1, wherein the point sources are configured to emit light through external stimulation.

10. The target of claim 1, wherein the one or more surfaces comprise the multiple surfaces including first and second flat surfaces at different distances from the base with the first point source disposed on the first flat surface and the second point source disposed on the second flat surface.

11. The target of claim 1, wherein the one or more surfaces comprise the surface that is sloped.

12. The target of claim 1, wherein the structure is configured to impart a predetermined phase change pattern to light transmitted through the structure.

13. An imaging apparatus comprising:
   an imaging detector;
   an optical or computational objective configured to form an image of a specimen on the detector; and
   an imaging target disposed in the position of the specimen and comprising:
      a structure, formed on a substrate, wherein the structure includes a base and one or more surfaces, wherein the one or more surfaces include multiple surfaces spaced apart from the base and disposed over a range of distances from the base or a surface that is sloped relative to the base such that different points on the surface that is sloped are disposed over a range of distances from the base; and
      multiple point sources disposed along the one or more surfaces of the structure, wherein the point sources include at least first and second point sources disposed along the one or more surfaces at different distances from the base, each of the point sources having dimensions that are smaller than a diffraction limit of the optical system.

14. The imaging apparatus of claim 13, further comprising a diffractive optical element in a detection path of light leaving the imaging target.

15. The imaging apparatus of claim 14, wherein the diffractive optical element forms an engineered point spread function for the imaging apparatus.

16. The imaging apparatus of claim 15, wherein the engineered point spread function is a double-helix PSF or a tetrapod PSF.

17. The imaging apparatus of claim 13, wherein the image formed on the detector is characterized to resolve features beyond the diffraction limit of the objective.

18. A method for characterizing a single-modal or multi-modal imaging apparatus comprising:
   forming a structure on an optical substrate, wherein the structure has a base and one or more surfaces, wherein the one or more surfaces include multiple surfaces spaced apart from the base and disposed over a range of distances from the base or a surface that is sloped relative to the base such that different points on the surface that is sloped are disposed over a range of distances from the base, wherein the structure imparts a change of phase to transmitted light according to a pattern of optical path length differences;
   disposing multiple point sources along the one or more surfaces of the structure and configured to direct light through or from the structure, each of the point sources having dimensions that are smaller than a diffraction limit of the optical system; and
   recording a phase change distribution for the directed light from the one or more point sources.

19. The method of claim 18, further comprising determining an optical path length or an index of refraction according to the phase change distribution.

20. The method of claim 18, wherein recording the phase change distribution comprises generating tomography images.

21. A method to form a calibration target, the method comprising:
   forming a structure on a substrate, wherein the structure includes a base and one or more surfaces, wherein the one or more surfaces include multiple surfaces spaced apart from the base or a surface that is sloped relative to the base; and disposing multiple point sources along the one or more surfaces of the structure with the point sources disposed over a range of distances from the base, including disposing first and second point sources along the one or more surfaces at different distances from the base, each of the point sources having dimensions that are smaller than a diffraction limit of the optical system.

* * * * *